United States Patent
Donchey

(10) Patent No.: US 11,798,393 B2
(45) Date of Patent: Oct. 24, 2023

(54) SYSTEM AND METHOD OF MONITORING SPOILAGE CONDITIONS OF A PRODUCT

(71) Applicant: Jonathan Donchey, Roslyn, NY (US)

(72) Inventor: Jonathan Donchey, Roslyn, NY (US)

( * ) Notice: Subject to any disclaimer, the term of this patent is extended or adjusted under 35 U.S.C. 154(b) by 129 days.

(21) Appl. No.: 17/390,379

(22) Filed: Jul. 30, 2021

(65) Prior Publication Data

US 2022/0036718 A1 Feb. 3, 2022

Related U.S. Application Data

(60) Provisional application No. 63/150,474, filed on Feb. 17, 2021, provisional application No. 63/059,098, filed on Jul. 30, 2020.

(51) Int. Cl.
*G08B 21/20* (2006.01)
*B65D 81/18* (2006.01)
(Continued)

(52) U.S. Cl.
CPC ............ *G08B 21/20* (2013.01); *B65D 81/18* (2013.01); *F25D 29/008* (2013.01);
(Continued)

(58) Field of Classification Search
CPC .. G08B 21/20; H01L 12/2827; H01L 12/2825
See application file for complete search history.

(56) References Cited

U.S. PATENT DOCUMENTS

2008/0258628 A1* 10/2008 Higley .................. H05B 45/30
315/86
2010/0301990 A1* 12/2010 Bourget .............. H05B 47/155
340/3.1
(Continued)

FOREIGN PATENT DOCUMENTS

WO WO2009095919 A2 8/2009
WO WO2017175243 A1 10/2017

OTHER PUBLICATIONS

Modeling of an IoT-enabled supply chain for perishable food with two echelon supply hubs, https://www.emerald.com/insight/content/doi/10.1108/IMDS-10-2016-0456/full/html.
(Continued)

*Primary Examiner* — Kam Wan Ma

(57) ABSTRACT

A system and a method are used to monitor spoilage conditions of a product. The system includes at least one two-way humidity control system and at least one computing system. The two-way humidity control system includes at least one beacon sensor, a normal humidity range is stored on the two-way humidity control system, and the two-way humidity control system is positioned within at least one enclosed product storage. The enclosed product storage is a sealed area where products can be stored to maintain the products in optimal environmental conditions. The two-way humidity control system detects humidity readings and regulates humidity within the enclosed product storage based on the normal humidity range. The beacon sensor detects environmental data and retrieves environmental data from other wireless sensors. The computing system processes the data collected by the beacon sensor to generate alerts, when the environmental conditions are abnormal, and environmental condition reports.

12 Claims, 19 Drawing Sheets

(51) Int. Cl.
*F25D 29/00* (2006.01)
*H04L 12/28* (2006.01)

(52) U.S. Cl.
CPC ...... *H04L 12/2827* (2013.01); *B65D 2203/00* (2013.01); *F25D 2500/06* (2013.01); *F25D 2700/16* (2013.01); *H04L 12/2825* (2013.01)

(56) References Cited

U.S. PATENT DOCUMENTS

2015/0195099 A1* 7/2015 Imes ................ H04L 12/2827
 700/275
2017/0321961 A1* 11/2017 Tobin ................ F25B 49/005

OTHER PUBLICATIONS

IoT based Perishable Food and Vegetables delivery tracking architecture, https://www.rfwireless-world.com/Articles/IoT-based-Perishable-Food-and-Vegetables-Tracking-System-Architecture.html.
Wiliot and Evrythng Bring Battery-free, Low-cost IoT Tags to All Products, https://evrythng.com/wiliot-and-evrythng-bring-battery free-low-cost-iot-tags-to-all-products/.

* cited by examiner ration claims a priority to the U.S. Provisional Patent application Ser. No. 63/590,098 filed on Jul. 30, 2021 and a priority to the U.S. Provisional Patent application Ser. No. 63/150,474 filed on Feb. 17, 2021.

SYSTEM AND METHOD OF MONITORING SPOILAGE CONDITIONS OF A PRODUCT

The current application claims a priority to the U.S. Provisional Patent application Ser. No. 63/590,098 filed on Jul. 30, 2021 and a priority to the U.S. Provisional Patent application Ser. No. 63/150,474 filed on Feb. 17, 2021.

FIELD OF THE INVENTION

The present invention relates generally to systems and methods of monitoring data. More specifically, the present invention is a system and method of monitoring spoilage conditions of a product.

BACKGROUND OF THE INVENTION

Products in multiple industries, including but not limited to, cold chain, food, medicine, alcohol, and tobacco, can easily spoil if not maintained in proper environmental conditions. These products are stored in specific areas, including but not limited to, refrigerators, freezers, or general containers. In order to make sure the environmental conditions stay constant; individuals manually check the product storage to prevent any of products from spoiling. This is a tedious process so other methods involve the use of humidity control packs or sensors in order to remotely monitor the environmental conditions. However, these humidity control packs and sensors do not work together in order to provide a unified, end-to-end solution to easily and efficiently monitor environmental conditions of products.

It is therefore an objective of the present invention to provide a system and method of monitoring spoilage conditions of a product. The system of the present invention provides a two-way humidity control system that includes at least one beacon sensor. The beacon sensor can detect environmental conditions or retrieve data from other wireless sensors. The two-way humidity control system regulates humidity within a product storage area and calibrates environmental readings collected by the beacon sensor. The system also includes a computing system which processes the data collected by the beacon sensor in order to send alerts to individuals when environmental conditions are abnormal.

DETAIL DESCRIPTIONS OF THE INVENTION

All illustrations of the drawings are for the purpose of describing selected versions of the present invention and are not intended to limit the scope of the present invention.

Figure 1:
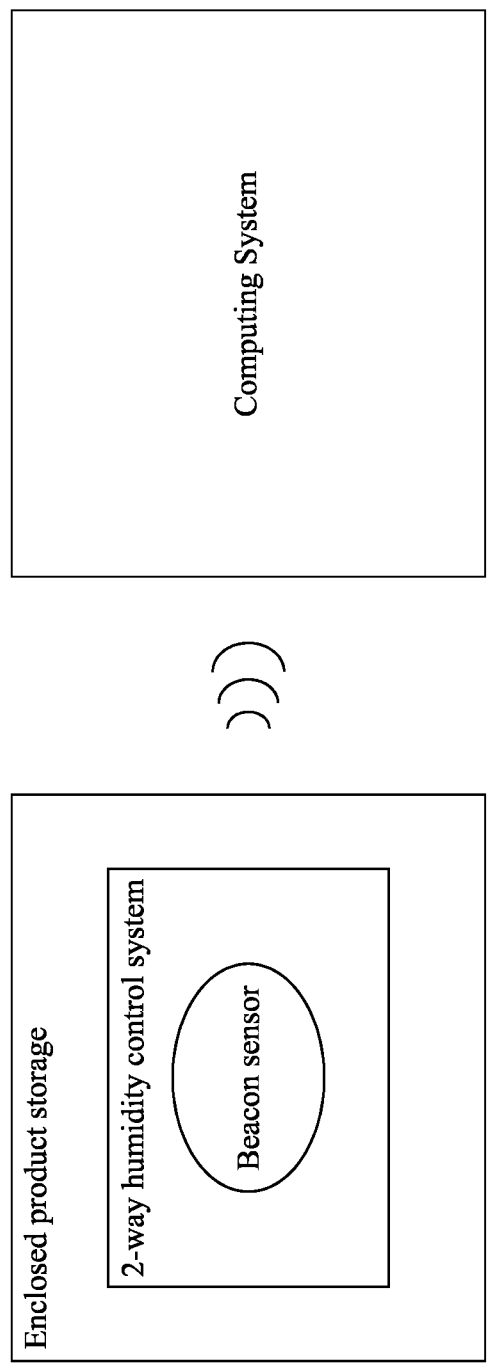
FIG. 1 is a diagram illustrating the overall system of the present invention.
Figure 2:
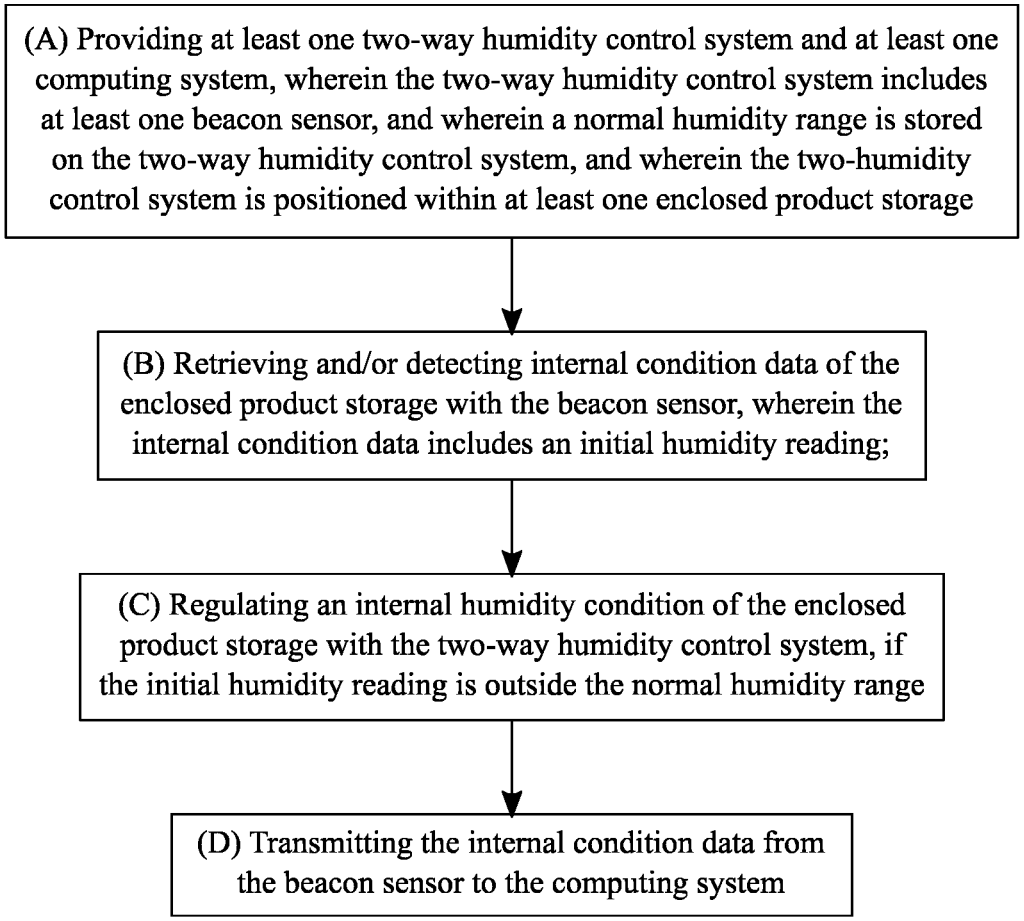
FIG. 2 is a flowchart illustrating the overall process for the method of the present invention.

In reference to FIGS. 1 through 19, the present invention is a system and method for monitoring spoilage conditions of a product. With reference to FIGS. 1 and 2, the system of the present invention includes at least one two-way humidity control system and at least one computing system (Step A). The two-way humidity control system includes at least one beacon sensor, a normal humidity range is stored on the two-way humidity control system, and the two-way humidity control system is positioned within at least one enclosed product storage. The enclosed product storage is a sealed area where products can be stored in order to maintain the products in optimal environmental conditions. For example, the enclosed product storage may be, but is not limited to, a refrigerator, a freezer, or general container. The two-way humidity control system detects humidity readings, regulates humidity within the enclosed product storage based on the normal humidity range, and calibrates readings retrieved and/or detected by the beacon sensor. The two-way humidity control system may further include a visual humidity level reader that is integrated into the two-way humidity control system. The visual humidity level reader allows an individual to manually check the internal humidity level of the enclosed product storage if necessary. The normal humidity range is a specific range of humidity level that is selected by the individual to preserve the products within the enclosed product storage. The beacon sensor detects environmental data and retrieves environmental data from other wireless sensors. The beacon sensor is preferably a battery free Bluetooth low energy (BLE) sensor. The computing system processes the data collected by the beacon sensor in order to generate alerts, when the environmental conditions are abnormal, and environmental condition reports. The computing system may include any type of computing device such as, but not limited to, a desktop computer, a cloud server, a gateway router, a notebook computer, a smartphone, a mobile tablet, or any combination thereof.

The method of the present invention follows an overall process for monitoring spoilage conditions of a product. With reference to FIG. 2, the beacon sensor retrieves and/or detects internal condition data of the enclosed product storage, and the internal condition data includes an initial humidity reading (Step B). Moreover, the internal condition data includes various types of environmental data such as, but not limited to, light-level, temperature, carbon dioxide percentage, pressure, and air quality. The initial humidity reading is a real-time humidity reading detected or retrieved solely by the beacon sensor. The two-way humidity control system regulates an internal humidity condition of the enclosed product storage, if the humidity reading is outside the normal humidity range (Step C). The internal humidity condition is the current and real-time humidity level within the enclosed product storage. The two-way humidity control system regulates the internal humidity condition of the enclosed product storage by releasing or absorbing moisture when necessary to maintain the internal humidity condition within the normal humidity range. Finally, the internal condition data is transmitted from the beacon sensor to the computing system (Step D). Step D allows the computing system to process the internal condition data in order to generate alerts when the internal condition data is abnormal and internal condition data reports.

Figure 3:
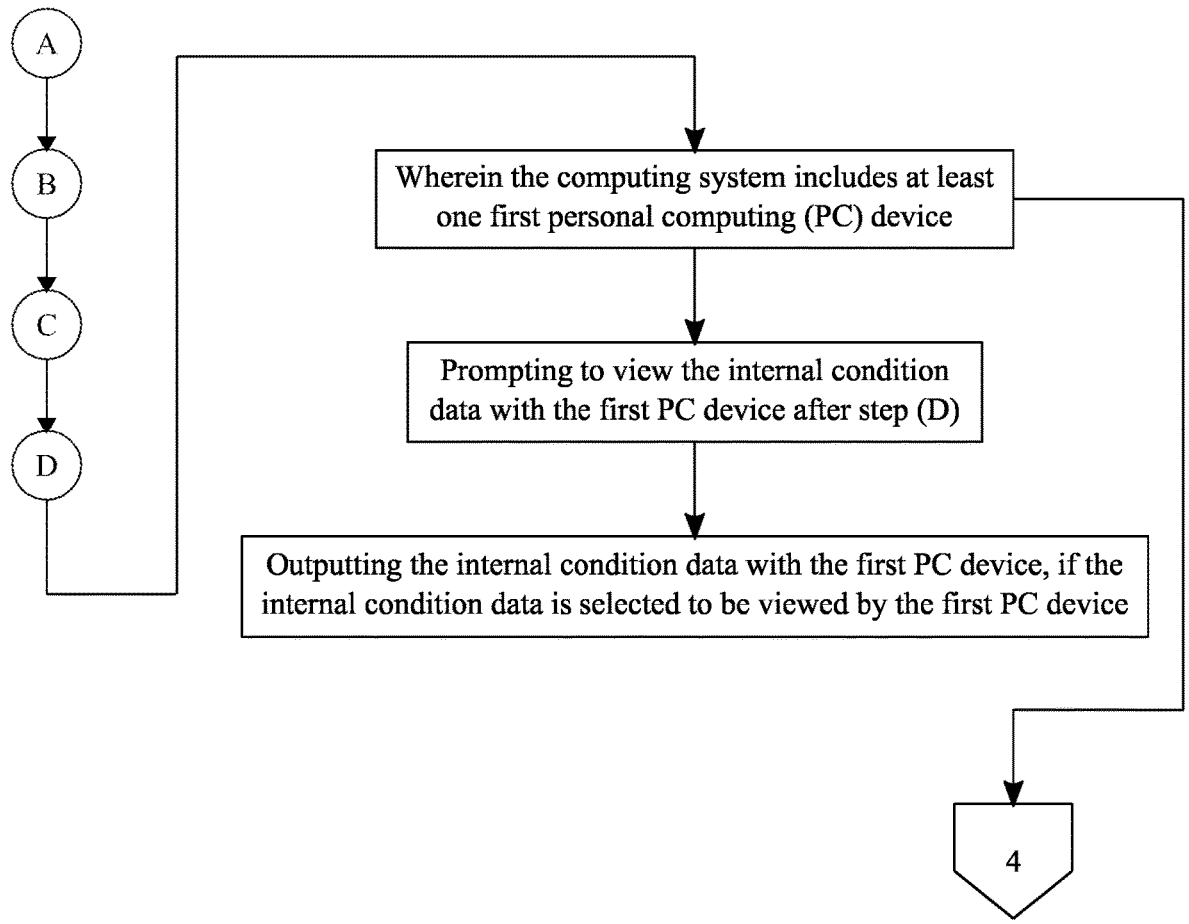
FIG. 3 is a flowchart illustrating the subprocess for the computing system as a local communication setup.

In an embodiment where the present invention is in a local communication setup and with reference to FIG. 3, the following subprocess is executed. The computing system includes at least one first personal computing (PC) device. Preferably, the first PC device is a mobile computing device such as a smartphone or mobile tablet. In this case, the first PC device is communicably coupled to the beacon sensor preferably through Bluetooth wireless communication. The first PC device prompts to view the internal condition after Step D. In more detail, an individual, using the first PC device, has the option to view the internal condition data. The internal condition data is outputted with the first PC device, if the internal condition is selected to be viewed by the first PC device. In more detail, the internal condition data is displayed to the individual through various visual representations including, but not limited to, a graphical and historical representation of the internal condition data, a timeline report of the internal condition data, a real-time data chart of the internal condition data, and/or a data history report of the internal condition data.

Figure 4:
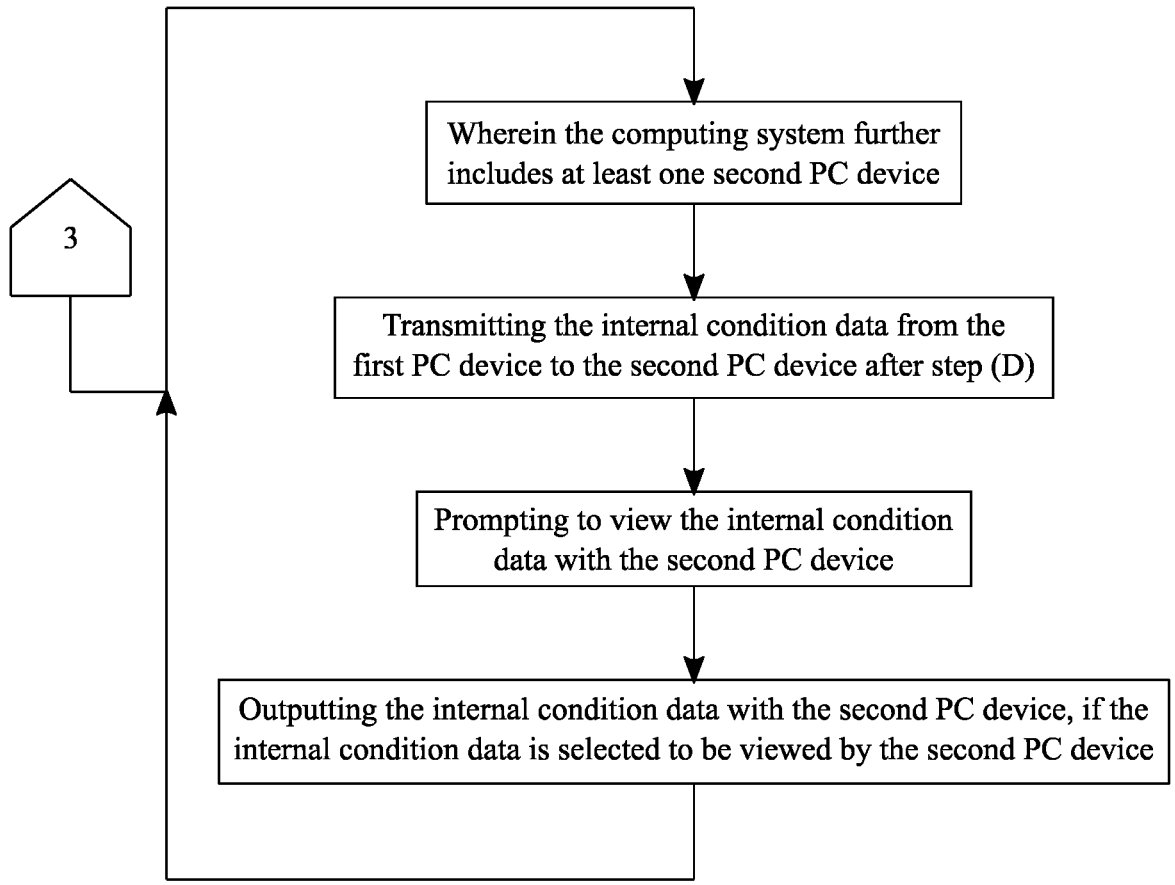
FIG. 4 is a flowchart illustrating the subprocess of transmitting the internal condition data to other PC devices in the local communication setup.
Figure 5:
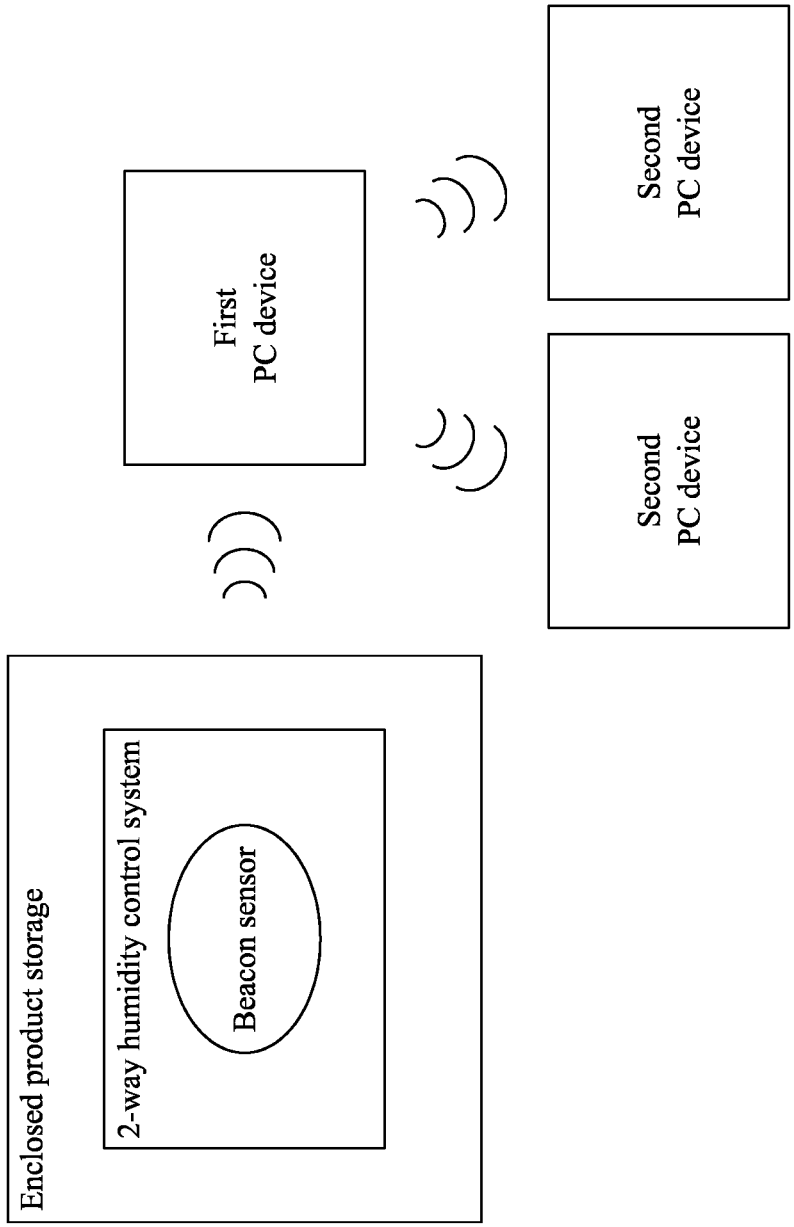
FIG. 5 is a diagram illustrating the system for the local communication setup.

Further, in order to transmit the internal condition data to other PC devices and with reference to FIGS. 4 and 5, the following subprocess can be executed. The computing system further includes at least one second PC device. The second PC device may be any type of computing device such as, but not limited to, a desktop computer, notebook computer, a smartphone, a mobile tablet. The internal condition data is transmitted from the first PC device to the second PC device after Step D. In more detail, the second PC device is communicably coupled to the first PC device through a long-range wireless connection such as a Wi-Fi connection or a cellular connection, thus, the internal condition data can be transmitted from the first PC device to the second PC device. Similar to the first PC device, the second PC device prompts to view the internal condition data. In more detail, an individual, using the second PC device, has the option to view the internal condition data. The internal condition data is outputted with the second PC device, if the internal condition is selected to be viewed by the second PC device. In more detail, the internal condition data is displayed to the individual, using the second PC device, through various visual representations including, but not limited to, a graphical and historical representation of the internal condition data, a timeline report of the internal condition data, a real-time data chart of the internal condition data, and/or a data history report of the internal condition data.

Figure 6:
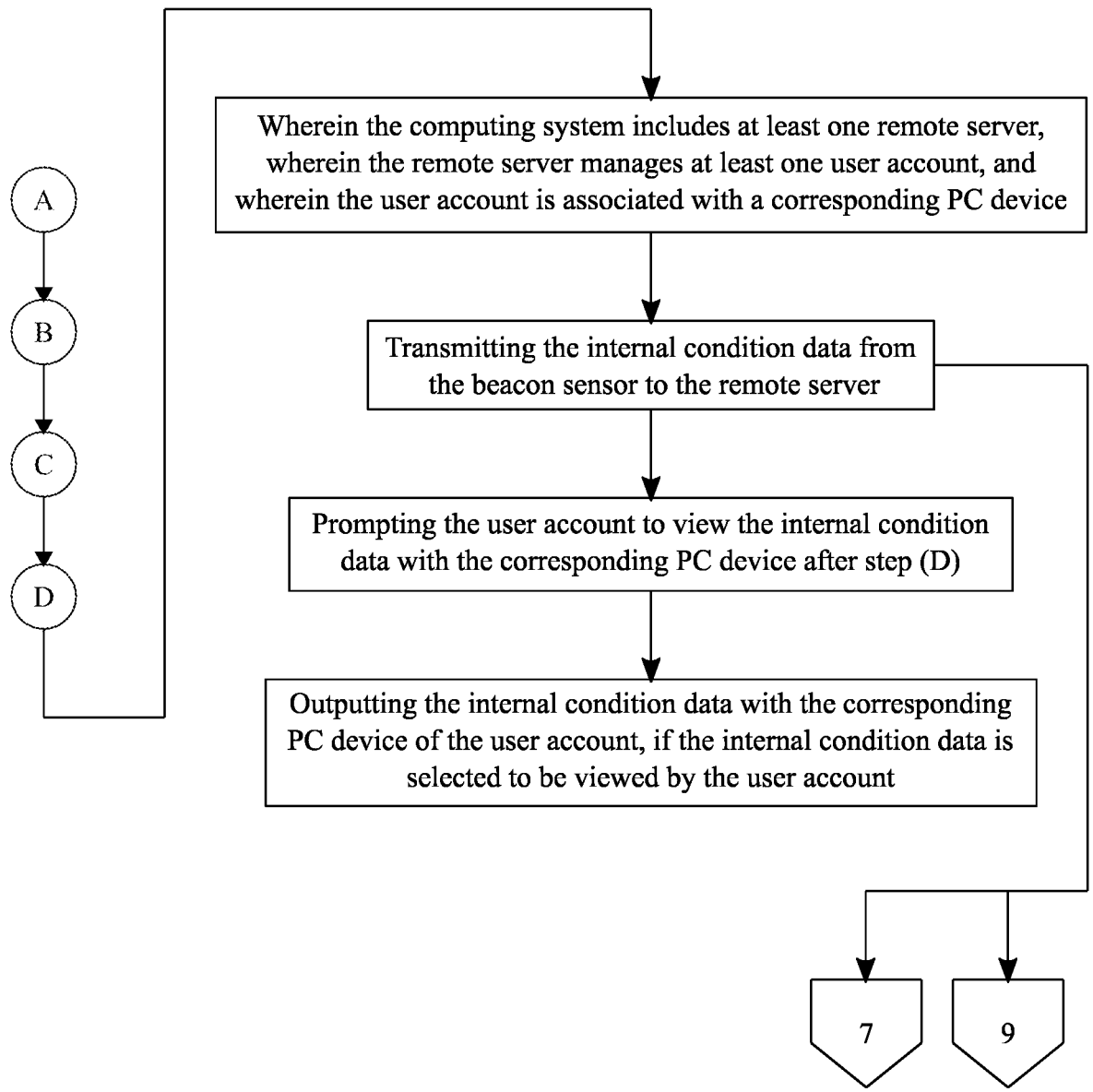
FIG. 6 is a flowchart illustrating the subprocess for the computing system as a long-range communication setup.
Figure 7:
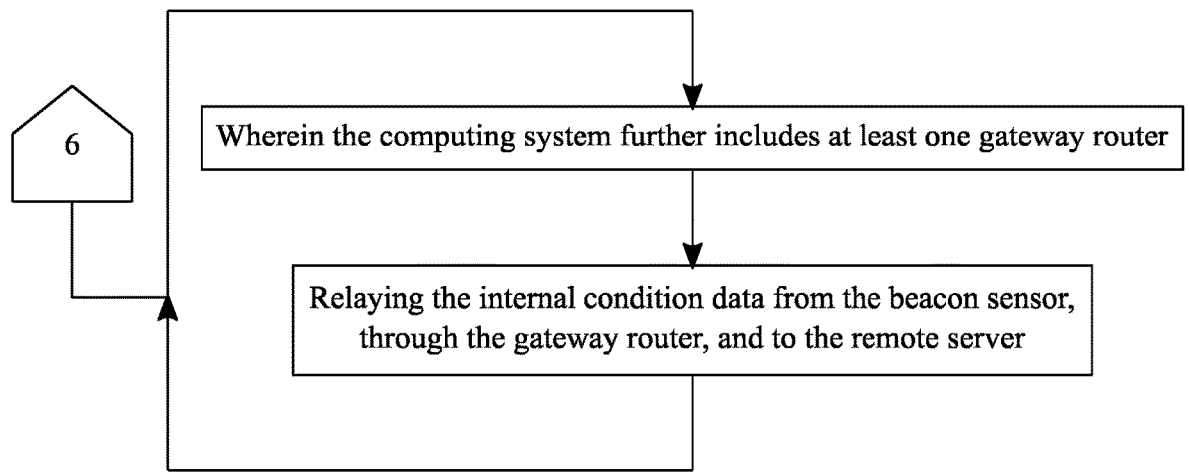
FIG. 7 is a flowchart illustrating the subprocess of relaying the internal condition data from the beacon sensor, through the gateway router, to the remote server.
Figure 8:
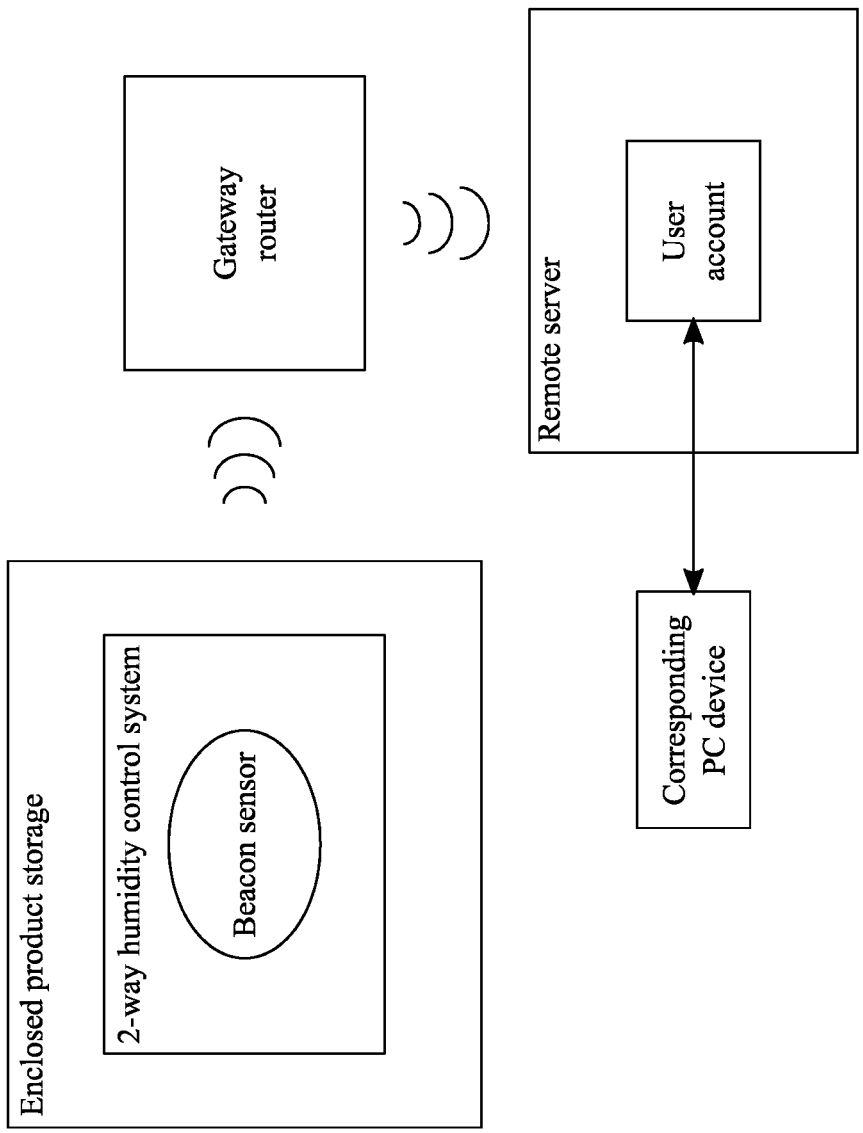
FIG. 8 is a diagram illustrating the system for the long-range communication setup using the gateway router.
Figure 9:
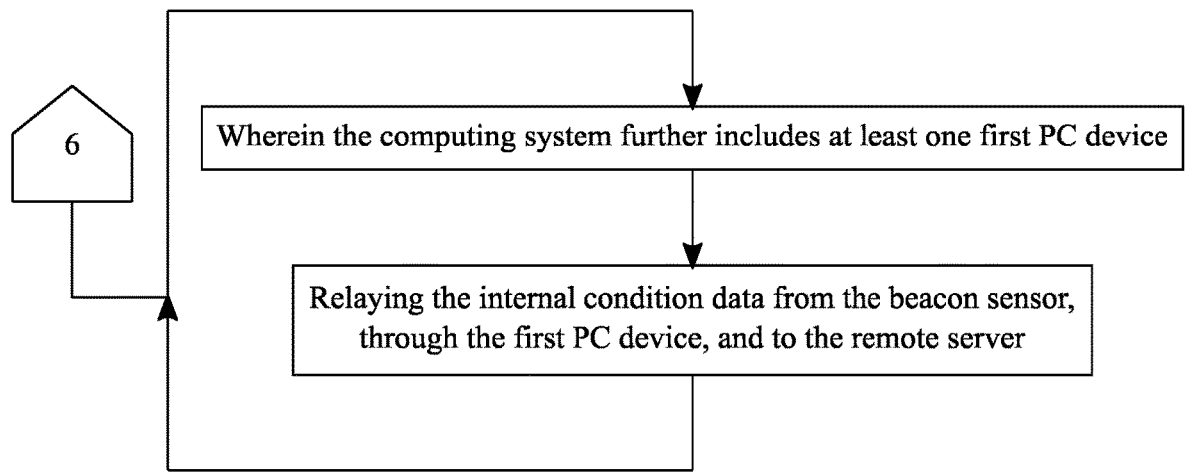
FIG. 9 is a flowchart illustrating the subprocess of relaying the internal condition data from the beacon sensor, through the first PC device, to the remote server.
Figure 10:
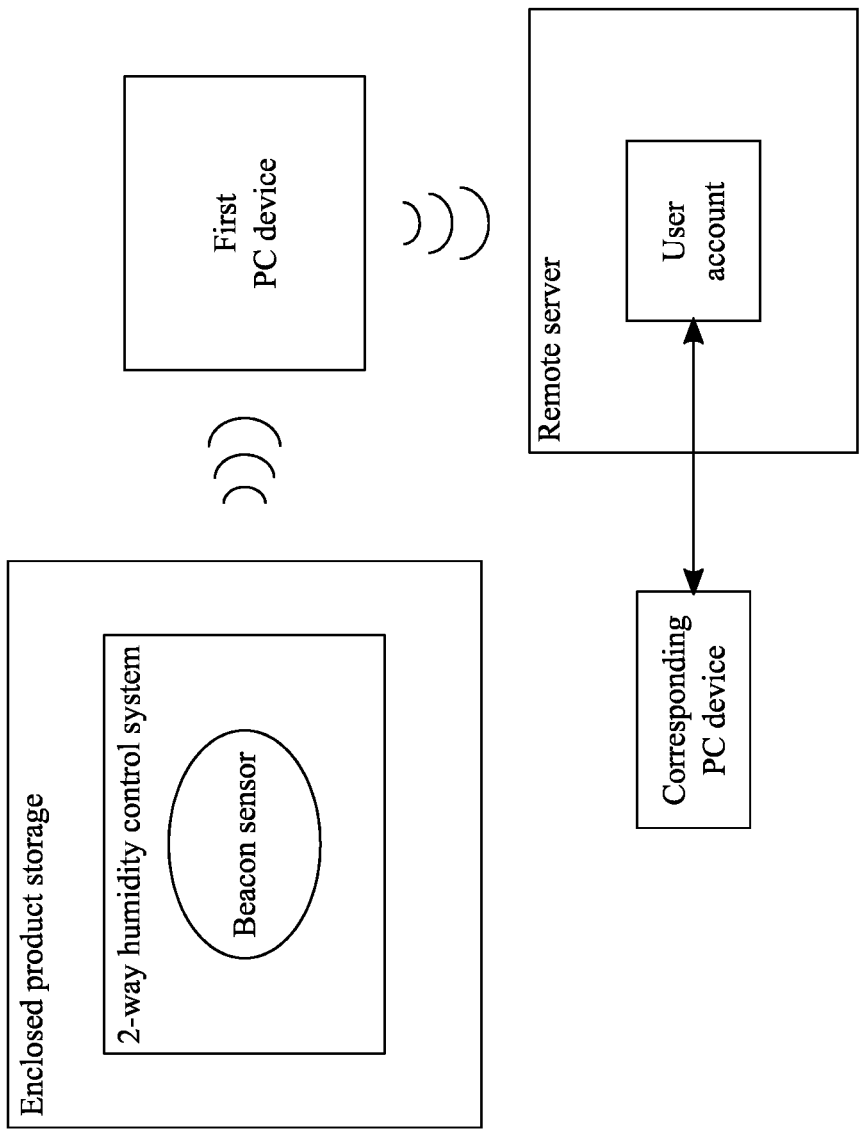
FIG. 10 is a diagram illustrating the system for the long-range communication setup using the first PC device.

In another embodiment where the present invention is in a long-range wireless communication setup and with reference to FIG. 6, the following subprocess is executed. The computing system includes at least one remote server, the remote server manages at least one user account, and the user account is associated with a corresponding PC device. The remote server is a cloud server that manages and processes data from the beacon sensor. The user account allows a user to access the data managed by the remote server. The corresponding PC device allows the user to interact with the software application managed by the remote server. The corresponding PC device may be any type of computing device such as, but not limited to, a desktop computer, a notebook computer, a smartphone, a mobile tablet. The internal condition data is transmitted from the beacon sensor to the remote server. This transmission of data can be executed through multiple methods. Further, the transmission of the internal condition data allows the remote server to manage and process the internal condition data. The corresponding PC device prompts the user account to view the internal condition data. In more detail, the user associated to the user account, has the option to view the internal condition data. The internal condition data is outputted with the corresponding PC device of the user account, if the internal condition is selected to be viewed by the user account. In more detail, the internal condition data is displayed through various visual representations including, but not limited to, a graphical and historical representation of the internal condition data, a timeline report of the internal condition data, a real-time data chart of the internal condition data, and/or a data history report of the internal condition data.

As mentioned previously, the transmission of the internal condition data from the beacon sensor can be transmitted through multiple methods. In one embodiment and with reference to FIGS. 7 and 8, the following subprocess is executed. The computing system further includes at least one gateway router. The gateway router is preferably a wireless Bluetooth gateway router. In this case, the gateway router is communicably coupled to the beacon sensor through Bluetooth wireless communication. Thus, the internal condition data is relayed from the beacon sensor, through the gateway router, and to the remote server. Depending on the type of gateway router, the gateway router may transmit data via a Wi-Fi connection or cellular connection. Depending on the type of gateway router, the gateway router may be powered by one or a combination of the following: solar power, battery power, direct current or other. The gateway router may be equipped with various probes (one or more at a time) to receive data, including but not limited to, flood, temperature, wetness, and power loss. Alternatively and with reference to FIGS. 9 and 10, the computing system further includes at least one first PC device. The first PC device is preferably a mobile computing device such as a smartphone or mobile tablet. In this case, the first PC device is communicably coupled to the beacon sensor through Bluetooth wireless communication. Thus, the internal condition data is relayed from the beacon sensor, through the first PC device, and to the remote server.

Additionally, an individual can manage other beacon sensors through the computing system by communicably coupling the computing system to other beacon sensors. Through the computing system, the individual can view the details of the beacon sensor such as, but not limited to, the Mac address, the serial number, the beacon sensor type, and the functionality of the beacon sensor.

Figure 11:
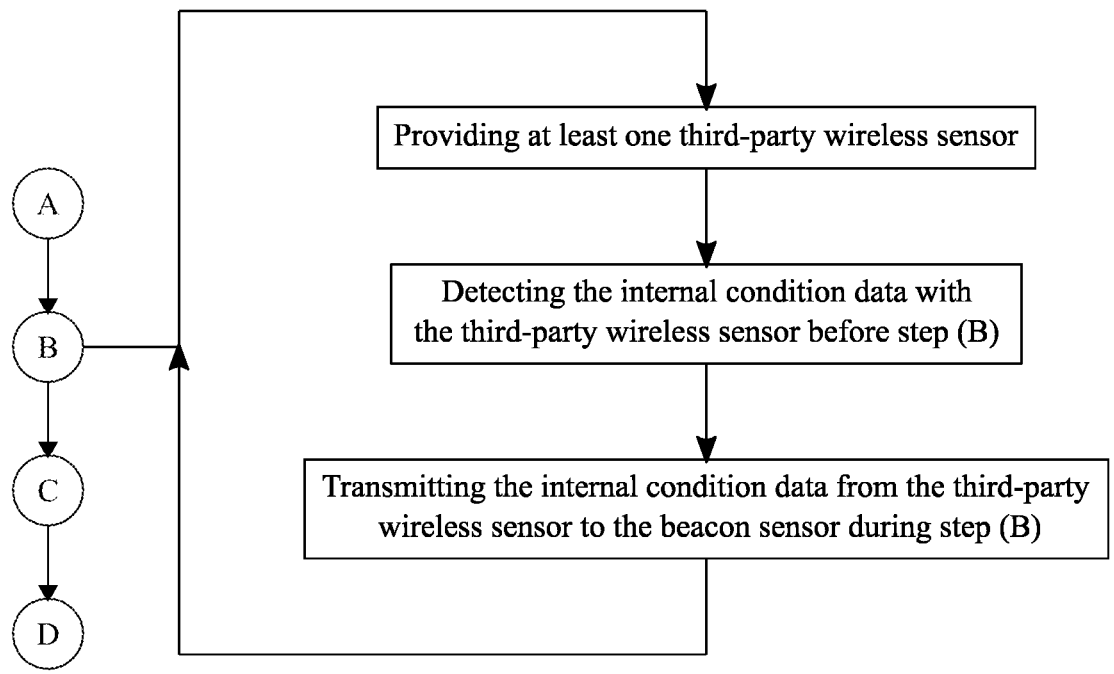
FIG. 11 is a flowchart illustrating the subprocess of retrieving the internal condition data from the third-party wireless sensor.
Figure 12:
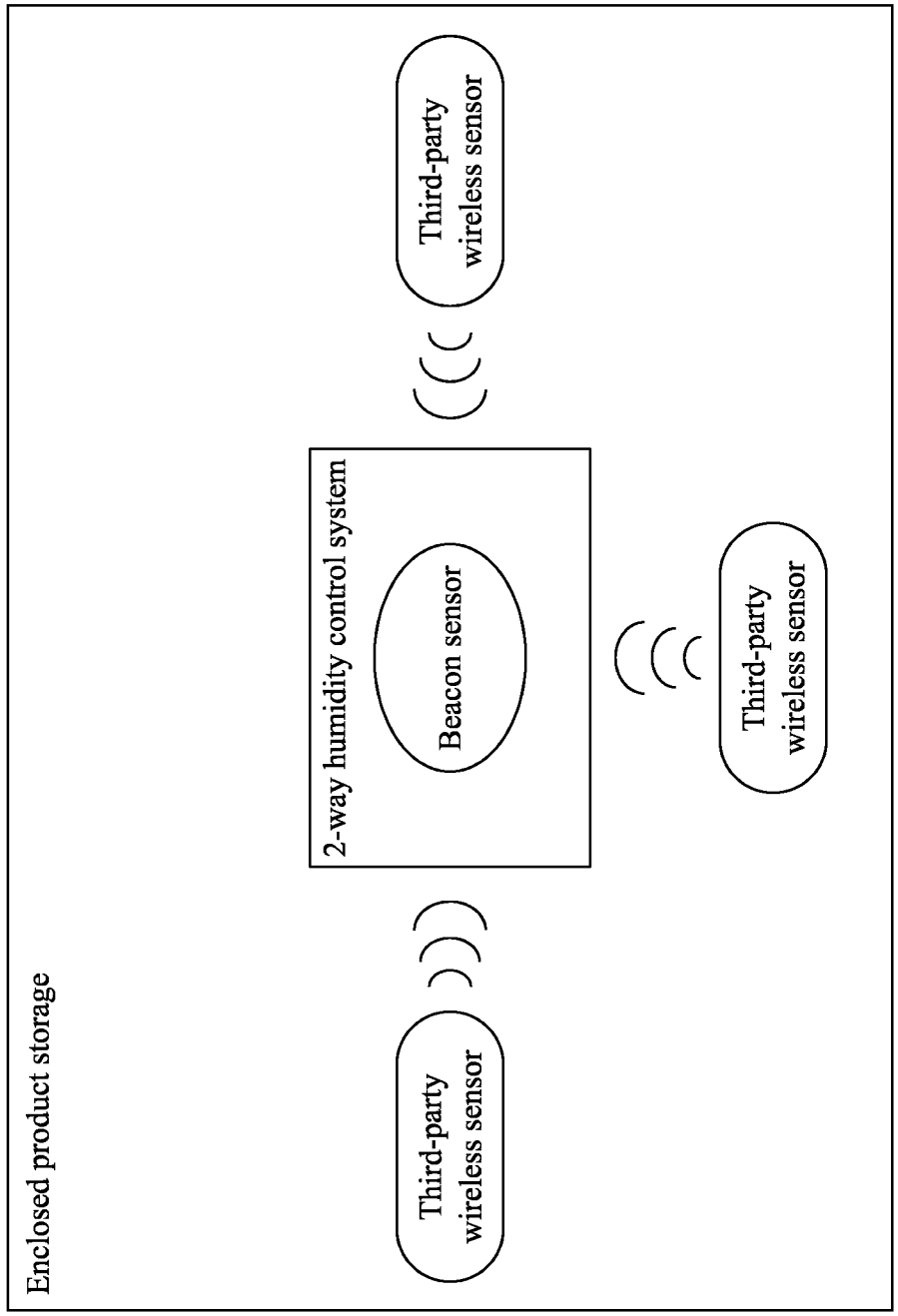
FIG. 12 is a diagram illustrating the system for the retrieval of internal condition data from the third-party wireless sensor.

In order for the beacon sensor to retrieve internal condition data and with reference to FIGS. 11 and 12, the following subprocess is executed. The system of the present invention may further include at least one third-party wireless sensor. The third-party wireless sensor can be any type of sensor such as, but not limited to, a sensor probe, a temperature gun, an external thermometer, an electrochemical sensor, or an optical sensor. The third-party wireless sensor detects internal condition data before Step B. The internal condition data includes various types of environmental data such as, but not limited to, light-level, temperature, humidity level, carbon dioxide percentage, pressure, and air quality. The internal condition data is transmitted from the third-party wireless sensor to the beacon sensor during Step B. Thus, the beacon sensor retrieves the internal condition data. Preferably, the third-party wireless sensor is a Bluetooth wireless sensor that can be communicably coupled to the beacon sensor through Bluetooth wireless communication.

Figure 13:
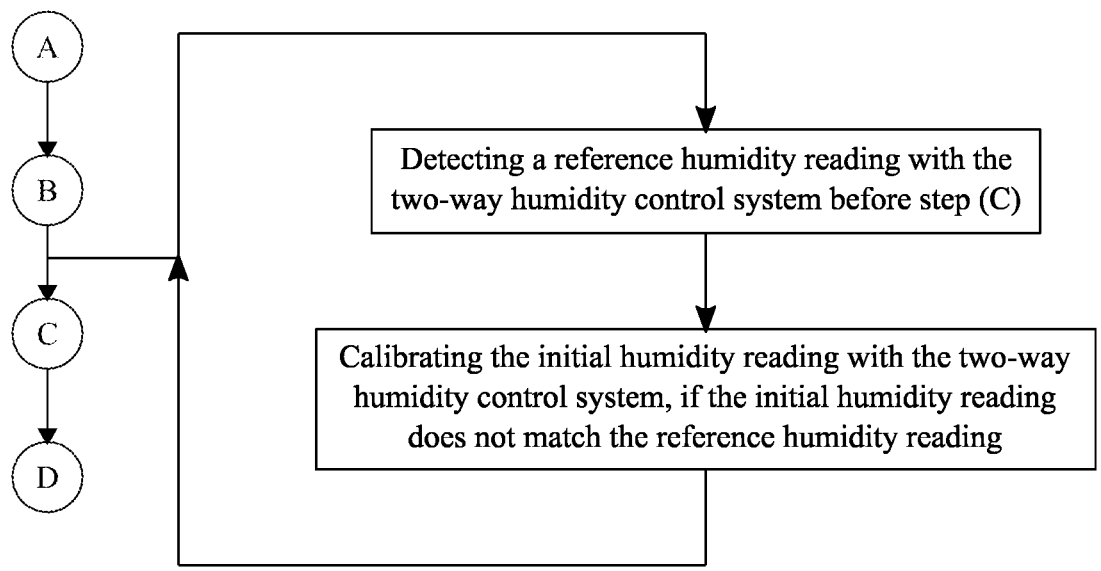
FIG. 13 is a flowchart illustrating the subprocess of calibrating the initial humidity reading.

In order for the present invention to calibrate humidity readings from the beacon sensor and with reference to FIG. 13, the following subprocess is executed. The two-way humidity control system detects a reference humidity reading before Step C. The reference humidity reading is a more accurate and precise humidity reading compared to the initial humidity reading. The two-way humidity control system calibrates the initial humidity reading, if the initial humidity reading does not match the reference humidity reading. Thus, the present invention calibrates humidity readings from the beacon sensor.

Figure 14:
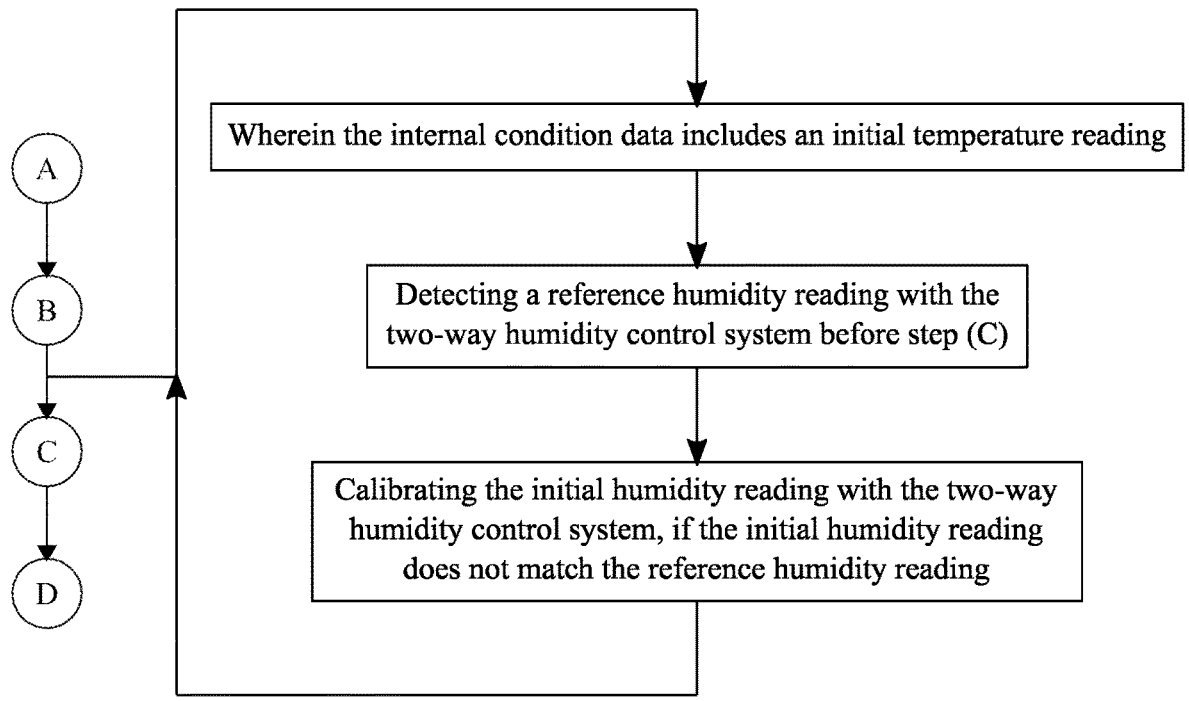
FIG. 14 is a flowchart illustrating the subprocess of calibrating the initial temperature reading.

Similarly, in order for the present invention to calibrate temperature readings from the beacon sensor and with reference to FIG. 14, the following subprocess is executed. The internal condition data includes an initial temperature reading. The two-way humidity control system detects a reference temperature reading before Step C. The reference temperature reading is a more accurate and precise temperature reading compared to the initial temperature reading. The two-way humidity control system calibrates the initial temperature reading, if the initial temperature reading does not match the reference temperature reading. Thus, the present invention calibrates humidity readings from the beacon sensor.

Figure 15:
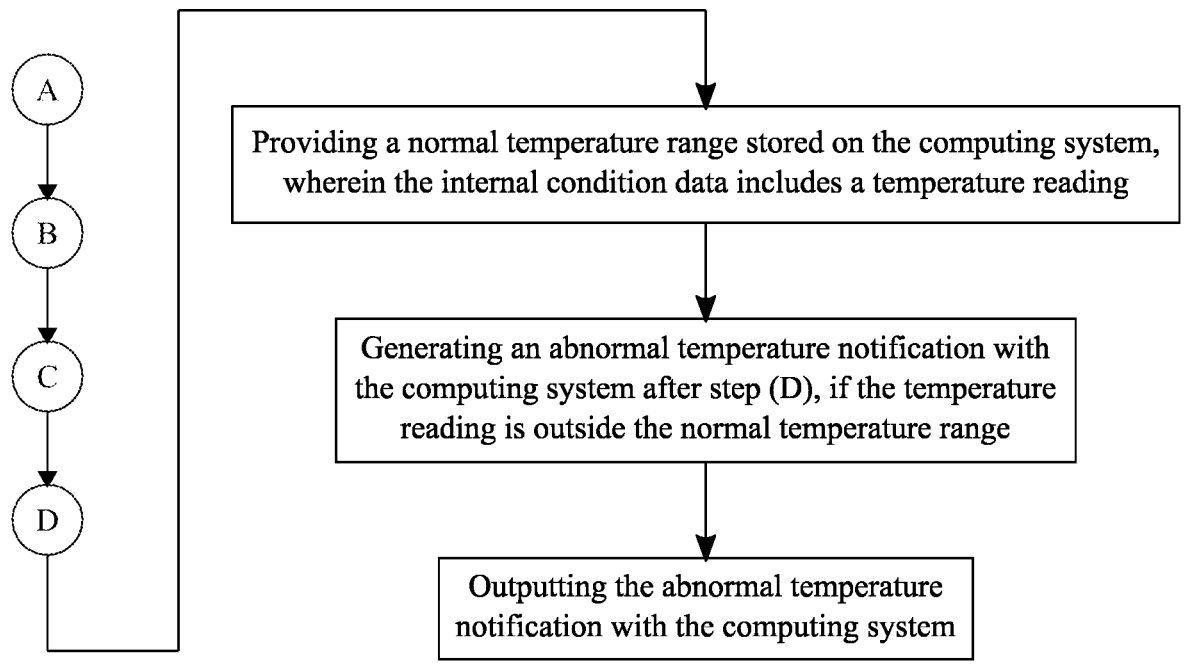
FIG. 15 is a flowchart illustrating the subprocess of outputting the abnormal temperature notification.

In order for the computing system to output an abnormal temperature alert and with reference to FIG. 15, the following subprocess is executed. A normal temperature range is stored on the computing system and the internal condition data includes a temperature reading. The normal temperature range is a specific range of temperature that is selected by the individual to preserve the products within the enclosed product storage. The temperature reading is a current and real-time reading of the temperature within the enclosed product storage. The computing system generates an abnormal temperature notification after Step D, if the temperature reading is outside the normal temperature range. In more detail, the computing system prepares the abnormal temperature notification to alert an individual. Finally, the computing system outputs the abnormal temperature notification. The abnormal temperature notification can be outputted as a text alert, a visual alert, a sound alert, and/or any combination thereof.

Figure 16:
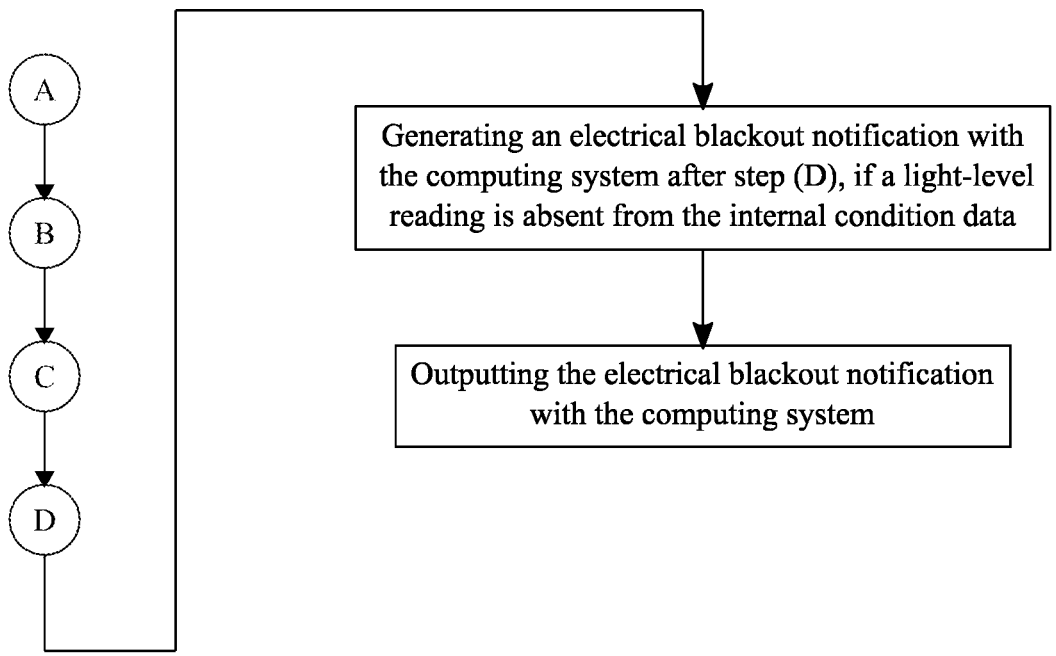
FIG. 16 is a flowchart illustrating the subprocess of outputting the electrical blackout notification.

In order for the computing system to output an electrical blackout alert and with reference to FIG. 16, the following subprocess is executed. The computing system generates an electrical blackout notification after Step D, if a light-level reading is absent from the internal condition data. If there is not light-level reading in the internal condition data, the computing system infers that there is a power loss within the enclosed product storage. Further, the computing system prepares the electrical blackout notification to alert an individual. Finally, the computing system outputs the electrical blackout notification. The electrical blackout notification can be outputted as a text alert, a visual alert, a sound alert, and/or any combination thereof.

Figure 17:
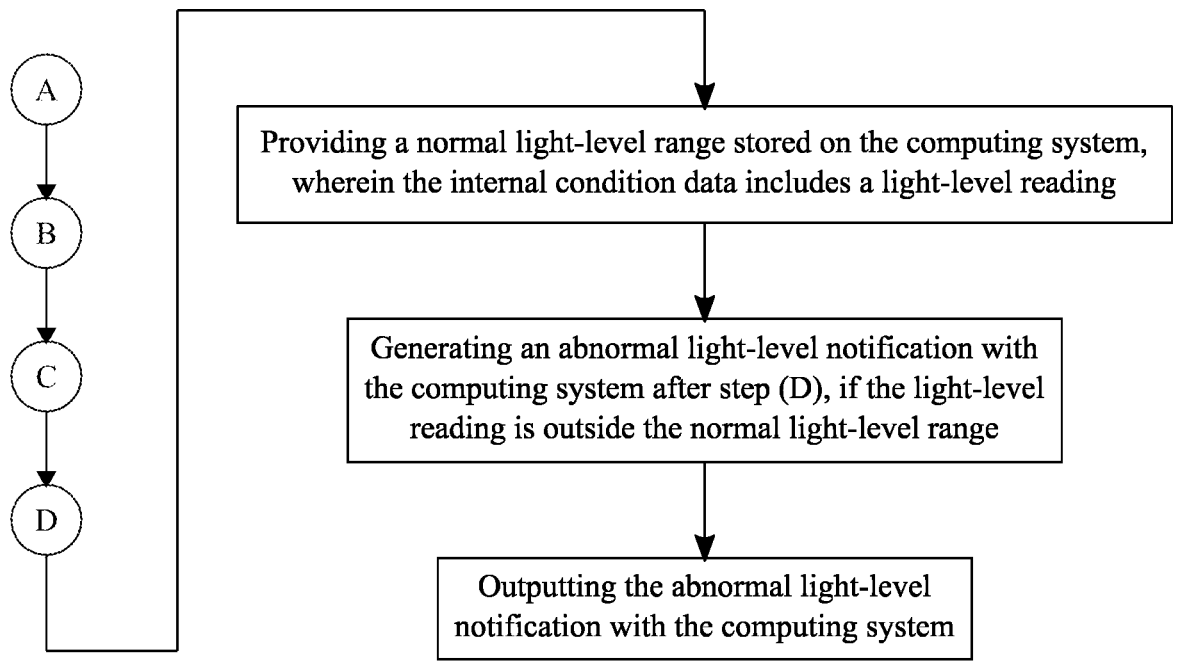
FIG. 17 is a flowchart illustrating the subprocess of outputting the abnormal light-level notification.

In order for the computing system to output an abnormal light-level alert and with reference to FIG. 17, the following subprocess is executed. A normal light-level range is stored on the computing system and the internal condition data includes a light-level reading. The normal light-level range is a specific range of light that is selected by the individual to preserve the products within the enclosed product storage. The light-level reading is a current and real-time reading of the light level within the enclosed product storage. The computing system generates an abnormal light-level notification after Step D, if the light-level reading is outside the normal light-level range. In more detail, the computing system prepares the abnormal light-level notification to alert an individual. Finally, the computing system outputs the abnormal light-level notification. The abnormal light-level notification can be outputted as a text alert, a visual alert, a sound alert, and/or any combination thereof.

Figure 18:
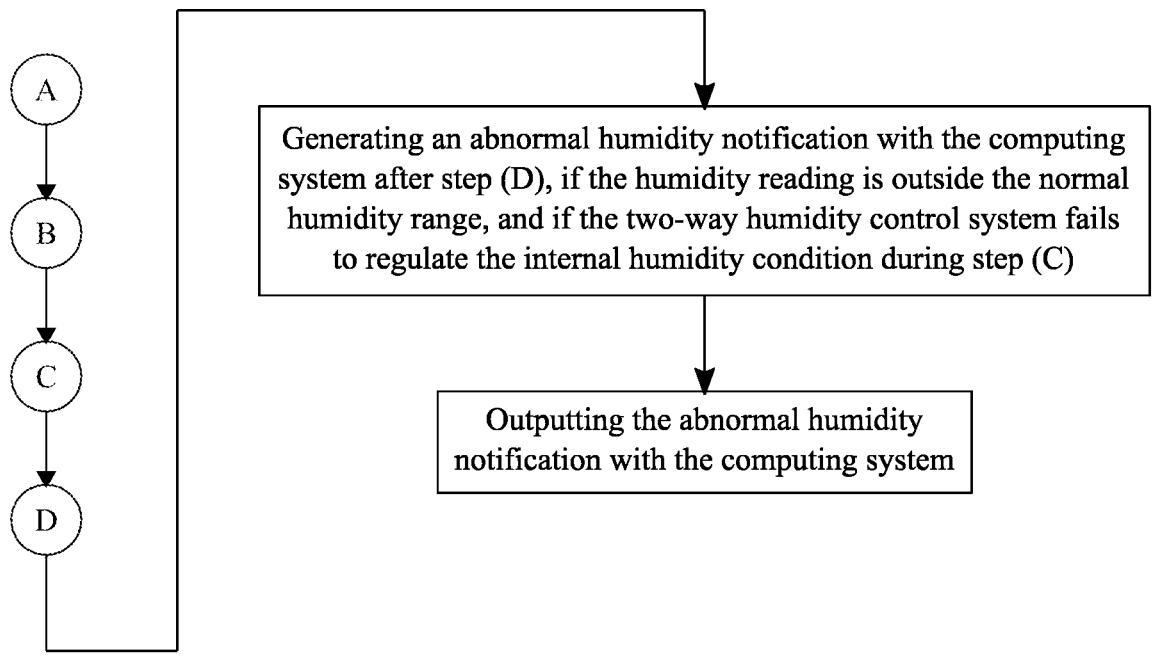
FIG. 18 is a flowchart illustrating the subprocess of outputting the abnormal humidity notification.

In order for the computing system to output an abnormal humidity alert and with reference to FIG. 18, the following subprocess is executed. The computing system generates an abnormal humidity notification after Step D, if the humidity reading is outside the normal humidity range and if the two-way humidity control system fails to regulate the internal humidity condition during Step C. In more detail, the computing system infers the humidity is too abnormal to be regulated, and thus, suggests there is a severe problem such as the expiration or spoilage of a product within the enclosed product storage. Further, the computing system prepares the abnormal humidity notification to alert an individual. Finally, the computing system outputs the abnormal humidity notification. The abnormal humidity notification can be outputted as a text alert, a visual alert, a sound alert, and/or any combination thereof.

Figure 19:
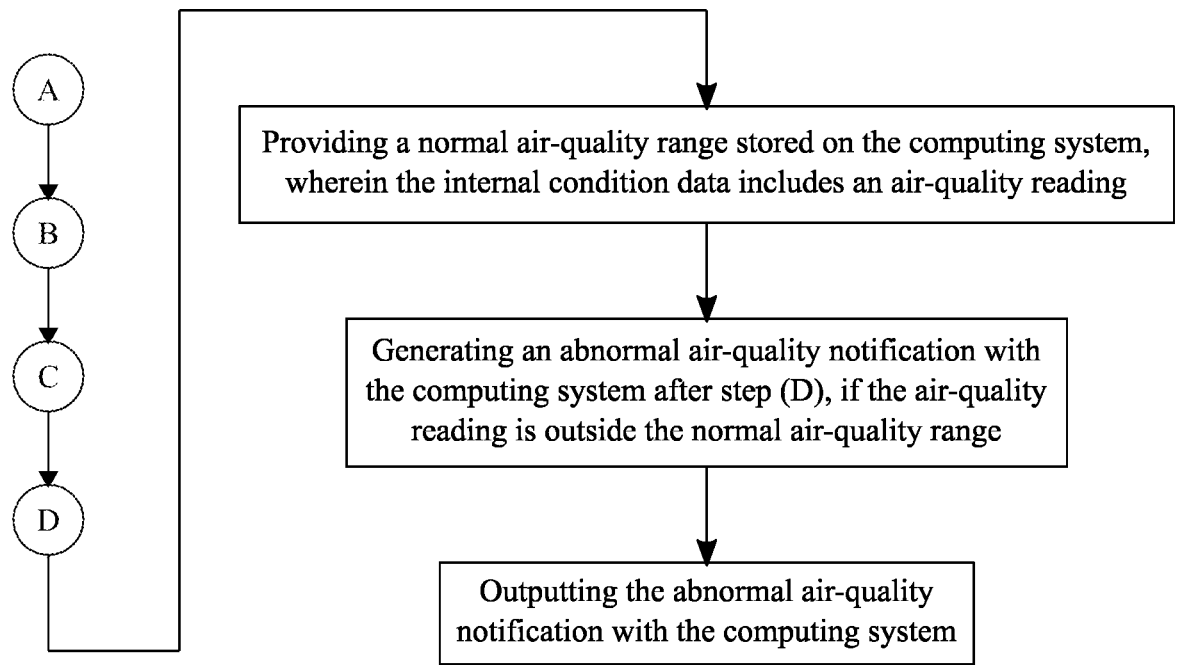
FIG. 19 is a flowchart illustrating the subprocess of outputting the abnormal air-quality notification.

In order for the computing system to output an abnormal air-quality alert and with reference to FIG. 19, the following subprocess is executed. A normal air-quality range is stored on the computing system and the internal condition data includes a air-quality reading. The normal air-quality range is a specific range of light that is selected by the individual to preserve the products within the enclosed product storage. The air-quality reading is a current and real-time reading of the light level within the enclosed product storage. The computing system generates an abnormal air-quality notification after Step D, if the air-quality reading is outside the normal air-quality range. In more detail, the computing system prepares the abnormal air-quality notification to alert an individual. Finally, the computing system outputs the abnormal air-quality notification. The abnormal air-quality notification can be outputted as a text alert, a visual alert, a sound alert, and/or any combination thereof.

Further, the present invention may further include an odor or fragrance capture feature. For the odor and fragrance capture feature, the system may further include an odor/fragrance capturing device that is positioned adjacent to a product within the enclosed product storage. The odor/fragrance capturing device captures the odor or fragrance of the product which can then be stored for the individual.

Further, the present invention may include other features such as a task list and assignment feature. Users can create customized task lists with details and inputs such as digital forms, rating scales, yes/no, good/bad, locations of tasks when completed can be verified by proximity to the beacon sensor or by scanning unique quick response (QR) barcodes assigned to locations. Task list can be triggered to appear in app only when user is in close proximity to assigned task's area, for example: task list for bathroom can only be seen and/or completed when in proximity to bathroom.

Further, the present invention may include other features such as a connect and share feature. Connect and share with other local users, information that may be mutually beneficial such as crime happening in the area, utilities shutting off, sharing space for emergency storage.

Further, the present invention may include other features such as a video recording feature to document compliance. Users can record physical condition of restaurant, store, products, etc. as well as capture processes such as food preparation and cleaning to document compliance.

Further, the present invention may include other features such as a QR label printing feature. Create and print food labels to help track food spoilage dates and ensure fresh product. QR code is encoded with 'Use By' date. Application scanning QR codes can keep track of vulnerable inventory as well as trigger alerts regarding any product past 'use by' date which may be spoiled and/or unsafe.

Further, the present invention may include other features such as an incident management feature. Create, manage, and resolve various incidents related to operations and equipment. Details include descriptions, comment, pictures, video, timestamps.

Further, the present invention may include other features such as a preventative maintenance (PM) feature. Create complete, and track preventative maintenance tasks, due dates, completion. Flag PM tasks that are overdue or incomplete. Assign PM tasks to designated users.

Further, the present invention may include other features such as an employee proximity tracking feature. Employee companion app which includes employee device registry; app tracks proximity of workers while they are within range of the beacon sensors and gateway routers at client site. Employee companion application only tracks proximity while within range of the beacon sensor at client site. Employee companion application senses the beacon sensor via Bluetooth and activates proximity measurement (proximity distance and time) with the beacon sensor and other employee companion applications. Once employee companion application no longer senses the beacon sensor via Bluetooth, the employee companion app discontinues tracking proximity distance and time. Alternatively, employee companion app proximity tracking can be triggered to begin and/or discontinue by global-positioning system (GPS) geo fence.

Further, the present invention may include other features such as a customer companion application feature. Customers can download a companion application with multiple features. For the customer, they can receive advertisements such as coupons and information about products, guide customers to product locations. For the store/restaurant owner, they can receive information about how long customers spend near a certain display by proximity, how many times customers are interacting with the beacon/getting information from the beacon, how many people are passing by the store/restaurant and not coming in (foot traffic).

Further, the present invention may include other features such as a maintenance of refrigerator and freezer units' feature. Track maintenance of refrigerator and freezer units, include creating and assigning tasks to schedule cleaning and maintenance of refrigerator and freezer units.

Further, the present invention may include other features such as a sensing preventive maintenance feature. Diagnose issues or potential issues that may lead to possible failure of one or more components of freezer or refrigerator units. By sensing temperature, humidity, light levels, vibration/impact/motion, the application can identify conditions outside of expected parameters and trigger alerts to necessary parties.

Although the invention has been explained in relation to its preferred embodiment, it is to be understood that many other possible modifications and variations can be made without departing from the spirit and scope of the invention as hereinafter claimed.

What is claimed is:
1. A method of monitoring spoilage conditions of a product, the method comprising the steps of:
(A) providing at least one two-way humidity control system and at least one computing system, wherein the two-way humidity control system includes at least one beacon sensor, and wherein a normal humidity range is stored on the two-way humidity control system, and wherein the two-way humidity control system is positioned within at least one enclosed product storage, and wherein the two-way humidity control system is configured to regulate humidity within the enclosed product storage based on the normal humidity range, and wherein the computing system is located outside and offset the at least one enclosed product storage, and wherein the computing system includes at least one first personal computing (PC) device;
(B) retrieving and/or detecting internal condition data of the enclosed product storage with the beacon sensor, wherein the internal condition data includes an initial humidity reading;
(C) regulating an internal humidity condition of the enclosed product storage with the two-way humidity control system, and updating the internal condition data with a subsequent humidity reading from the beacon sensor, if the initial humidity reading is outside the normal humidity range;
(D) wirelessly transmitting the internal condition data from the beacon sensor to the computing system;
sequentially executing steps (B) through (D);
prompting to view the internal condition data with the first PC device after step (D);
outputting the internal condition data with the first PC device, if the internal condition data is selected to be viewed by the first PC device;
generating an electrical blackout notification with the computing system after step (D), if a light-level reading is absent from the internal condition data; and
outputting the electrical blackout notification with the computing system.

2. The method of monitoring spoilage conditions of a product, the method as claimed in claim 1 comprising the steps of:
wherein the computing system further includes at least one second PC device;
transmitting the internal condition data from the first PC device to the second PC device after step (D);
prompting to view the internal condition data with the second PC device; and outputting the internal condition data with the second PC device, if the internal condition data is selected to be viewed by the second PC device.

3. The method of monitoring spoilage conditions of a product, the method as claimed in claim 1 comprising the steps of:
wherein the computing system includes at least one remote server, wherein the remote server manages at least one user account, and wherein the user account is associated with a corresponding PC device;
transmitting the internal condition data from the beacon sensor to the remote server;
prompting the user account to view the internal condition data with the corresponding PC device; and
outputting the internal condition data with the corresponding PC device of the user account, if the internal condition data is selected to be viewed by the user account.

4. The method of monitoring spoilage conditions of a product, the method as claimed in claim 3 comprising the steps of:
wherein the computing system further includes at least one gateway router; and
relaying the internal condition data from the beacon sensor, through the gateway router, and to the remote server.

5. The method of monitoring spoilage conditions of a product, the method as claimed in claim 4 comprising the step of:
relaying the internal condition data from the beacon sensor, through the first PC device, and to the remote server.

6. The method of monitoring spoilage conditions of a product, the method as claimed in claim 1 comprising the steps of:
providing at least one third-party wireless sensor;
detecting the internal condition data with the third-party wireless sensor before step (B); and
transmitting the internal condition data from the third-party wireless sensor to the beacon sensor during step (B).

7. The method of monitoring spoilage conditions of a product, the method as claimed in claim 1 comprising the steps of:
detecting a reference humidity reading with the two-way humidity control system before step (C); and
calibrating the initial humidity reading with the two-way humidity control system, if the initial humidity reading does not match the reference humidity reading.

8. The method of monitoring spoilage conditions of a product, the method as claimed in claim 1 comprising the steps of:
wherein the internal condition data includes an initial temperature reading;
detecting a reference temperature reading with the two-way humidity control system before step (C); and
calibrating the initial temperature reading with the two-way humidity control system, if the initial temperature reading does not match the reference temperature reading.

9. The method of monitoring spoilage conditions of a product, the method as claimed in claim 1 comprising the steps of:
providing a normal temperature range stored on the computing system, wherein the internal condition data includes a temperature reading;
generating an abnormal temperature notification with the computing system after step (D), if the temperature reading is outside the normal temperature range; and
outputting the abnormal temperature notification with the computing system.

10. The method of monitoring spoilage conditions of a product, the method as claimed in claim 1 comprising the steps of:
providing a normal light-level range stored on the computing system, wherein the internal condition data includes a light-level reading;
generating an abnormal light-level notification with the computing system after step (D), if the light-level reading is outside the normal light-level range; and
outputting the abnormal light-level notification with the computing system.

11. The method of monitoring spoilage conditions of a product, the method as claimed in claim 1 comprising the steps of:
generating an abnormal humidity notification with the computing system after step (D), if the initial humidity reading is outside the normal humidity range, and if the two-way humidity control system fails to regulate the internal humidity condition during step (C); and
outputting the abnormal humidity notification with the computing system.

12. The method of monitoring spoilage conditions of a product, the method as claimed in claim 1 comprising the steps of:
providing a normal air-quality range stored on the computing system, wherein the internal condition data includes an air-quality reading;
generating an abnormal air-quality notification with the computing system after step (D), if the air-quality reading is outside the normal air-quality range; and
outputting the abnormal air-quality notification with the computing system.

* * * * *